(12) United States Patent
Cox (10) Patent No.: US 11,698,446 B2
(45) Date of Patent: Jul. 11, 2023

(54) VERTICALLY STACKED LIDAR ASSEMBLY

(71) Applicant: GM Cruise Holdings LLC, San Francisco, CA (US)

(72) Inventor: Matthew Cox, San Francisco, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 695 days.

(21) Appl. No.: 16/691,846

(22) Filed: Nov. 22, 2019

(65) Prior Publication Data

US 2021/0103038 A1 Apr. 8, 2021

Related U.S. Application Data

(60) Provisional application No. 62/911,979, filed on Oct. 7, 2019.

(51) Int. Cl.
*G01S 7/481* (2006.01)
*G01S 17/931* (2020.01)
*G01S 7/497* (2006.01)

(52) U.S. Cl.
CPC .......... *G01S 7/4817* (2013.01); *G01S 7/4813* (2013.01); *G01S 7/497* (2013.01); *G01S 17/931* (2020.01)

(58) Field of Classification Search
CPC .... G01S 7/4817; G01S 17/931; G01S 7/4813; G01S 7/497
See application file for complete search history.

(56) References Cited

U.S. PATENT DOCUMENTS

| | | | |
|---|---|---|---|
| 2016/0282468 A1* | 9/2016 | Gruver | G01S 17/93 |
| 2016/0291134 A1* | 10/2016 | Droz | G01S 7/4817 |
| 2017/0168146 A1* | 6/2017 | Boehmke | G01S 17/931 |
| 2020/0103505 A1* | 4/2020 | Qiu | G01S 7/4863 |
| 2021/0155248 A1* | 5/2021 | Cox | G01S 17/87 |

FOREIGN PATENT DOCUMENTS

| | | |
|---|---|---|
| CN | 114730017 A | 7/2022 |
| EP | 4004599 A1 | 6/2022 |
| WO | 2021071537 A1 | 4/2021 |

OTHER PUBLICATIONS

"International Search Report for PCT Patent Application No. PCT/US2019/068857", dated May 28, 2020, 4 Pages.
(Continued)

*Primary Examiner* — Peter D Nolan
*Assistant Examiner* — Mikko Okechukwu Obioha
(74) *Attorney, Agent, or Firm* — Calfee, Halter & Griswold LLP (57) ABSTRACT

Various technologies described herein pertain to a vertically stacked lidar assembly of an autonomous vehicle. The vertically stacked lidar assembly includes a first lidar sensor system configured to spin about an axis and a second lidar sensor system configured to spin about the axis. The first lidar sensor system is vertically stacked above the second lidar sensor system in the vertically stacked lidar assembly. Moreover, the first lidar sensor system and the second lidar sensor system are coaxially aligned. Redundancy is provided by the vertically stacked lidar assembly including the first lidar sensor system and the second lidar sensor system.

20 Claims, 6 Drawing Sheets

(56) References Cited

OTHER PUBLICATIONS

"Written Opinion of the International Searching Authority for PCT Patent Application No. PCT/US2019/068857", dated May 28, 2020, 6 Pages.
"Office Action for European Patent Application No. 19843050.6", dated Mar. 10, 2022, 3 pages.
"Notification of Entry into the Examination Procedure for Patent Application for Invention for Chinese Patent Application No. 2019801011485", dated Sep. 15, 2022, 2 pages.
"Request for Substantive Examination for Chinese Patent Application No. 2019801011485", filed Sep. 8, 2022, 2 pages.
Response to the Office Action for European Patent Application No. 19843050.6, filed Sep. 13, 2022, 23 pages.

\* cited by examiner

VERTICALLY STACKED LIDAR ASSEMBLY

CROSS-REFERENCE TO RELATED APPLICATION

This application claims priority to U.S. Provisional Patent Application No. 62/911,979, filed on Oct. 7, 2019, and entitled "VERTICALLY STACKED LIDAR ASSEMBLY", the entirety of which is incorporated herein by reference.

BACKGROUND

An autonomous vehicle is a motorized vehicle that can navigate without a human driver. An exemplary autonomous vehicle includes a plurality of sensor systems such as, but not limited to, a lidar sensor system, a radar sensor system, a camera sensor system, amongst others. The autonomous vehicle is controlled based upon sensor signals outputted by the sensor systems. For example, a lidar sensor system may emit laser light into an environment. The laser light can reflect off object(s) in the environment and return to a detector of the lidar sensor system. Properties of the reflected laser light received at the detector of the lidar sensor system can be measured to generate a three-dimensional (3D) point cloud that is indicative of positions of objects in the environment surrounding the lidar sensor system. Moreover, velocities of the objects in the environment with respect to the lidar sensor system can also be detected by the lidar sensor system. A mechanical system of the autonomous vehicle (such as a steering system, a braking system, or a propulsion system) can be controlled based upon the generated point cloud.

Some conventional autonomous vehicles include more than one roof mounted lidar sensor system for purposes of redundancy. Accordingly, if one of the roof mounted lidar sensor systems fails, then a redundant roof mounted lidar sensor system can enable the autonomous vehicle to continue to operate. However, in various conventional autonomous vehicle architectures, a first roof mounted lidar sensor system may block a portion of a field of view of a second roof mounted lidar sensor system in an azimuthal direction (and vice versa) due to the relative locations at which the roof mounted lidar sensor systems are mounted on the autonomous vehicle.

SUMMARY

The following is a brief summary of subject matter that is described in greater detail herein. This summary is not intended to be limiting as to the scope of the claims.

Described herein are various technologies that pertain to a vertically stacked lidar assembly of an autonomous vehicle. The vertically stacked lidar assembly includes a first lidar sensor system configured to spin about an axis and a second lidar sensor system configured to spin about the axis. The first lidar sensor system is vertically stacked above the second lidar sensor system in the vertically stacked lidar assembly. Moreover, the first lidar sensor system and the second lidar sensor system are coaxially aligned. Redundancy is provided by the vertically stacked lidar assembly including the first lidar sensor system and the second lidar sensor system.

According to various embodiments, a spin rate of the first lidar sensor system can differ from a spin rate of the second lidar sensor system. Pursuant to other embodiments, the first lidar sensor system and the second lidar sensor system can spin about the axis at a common spin rate. A higher spin rate can lead to a higher update rate and a lower density of points in a 3D point cloud generated by a lidar sensor system, whereas a lower spin rate can lead to a lower update rate and a higher density of points in the 3D point cloud generated by the lidar sensor system. According to an example, a spin rate of the first lidar sensor system and/or a spin rate of the second lidar sensor system can be dynamically adjusted over time; however, it is also contemplated that the spin rates need not change over time.

In various embodiments, the first lidar sensor system and the second lidar sensor system can have differing angular ranges in an elevation direction. In yet other embodiments, the first lidar sensor system and the second lidar sensor system can have substantially similar angular ranges in the elevation direction.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a lidar assembly that includes a plurality of vertically stacked lidar sensor systems for an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something." Moreover, as used herein, the terms "perception algorithm" and "computer-implemented perception algorithm" are used interchangeably.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 1:
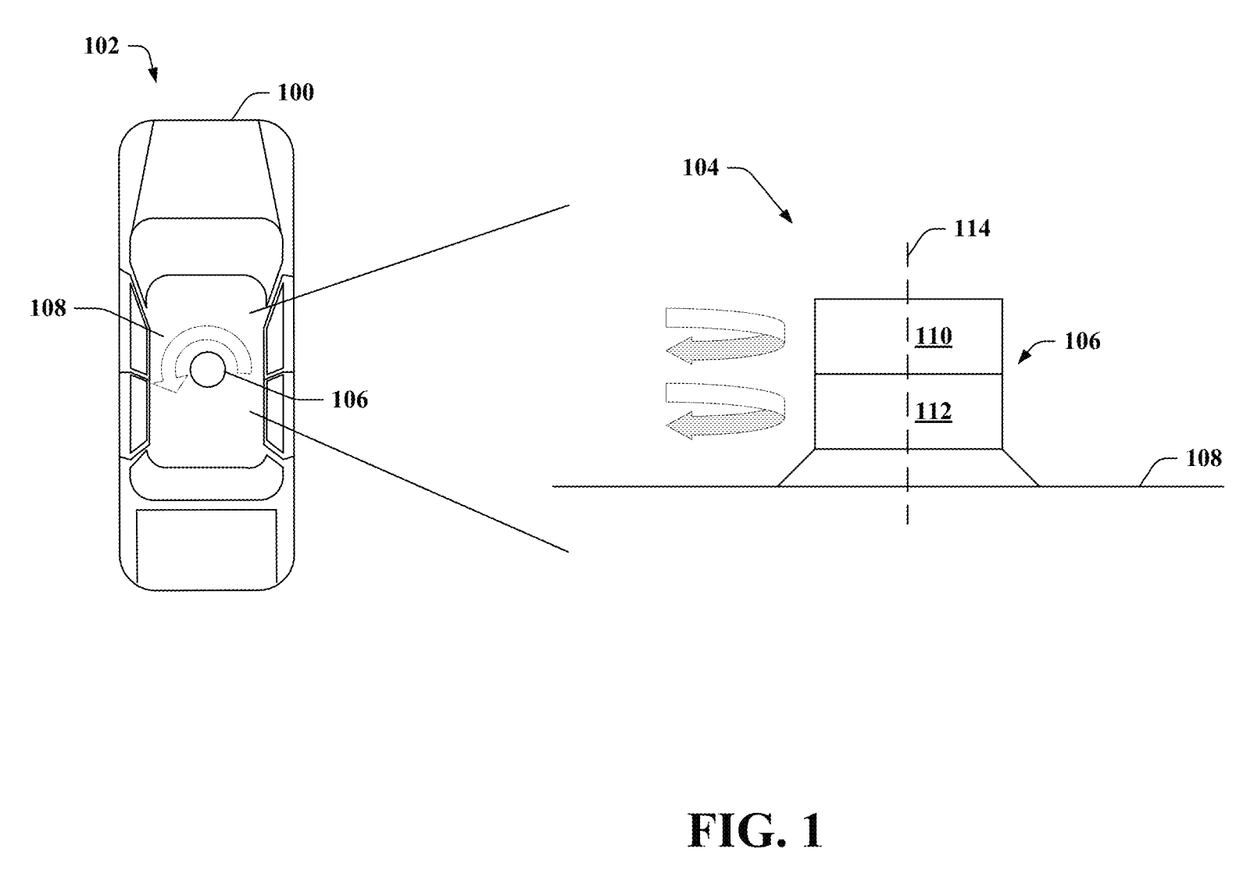
FIG. 1 illustrates a top view of an exemplary autonomous vehicle that includes a vertically stacked lidar assembly and an exploded side view of an upper portion of the autonomous vehicle including the vertically stacked lidar assembly.

Turning now to the drawings, FIG. 1 illustrates an exemplary autonomous vehicle 100. A top view of the autonomous vehicle 100 is shown at 102 and an exploded side view of an upper portion of the autonomous vehicle 100 is shown at 104. As depicted, the autonomous vehicle 100 includes a vertically stacked lidar assembly 106 mounted on a roof 108 of the autonomous vehicle 100.

The vertically stacked lidar assembly 106 includes two lidar sensor systems that are vertically stacked, namely, a lidar sensor system 110 and a lidar sensor system 112 (collectively referred to herein as the lidar sensor systems 110-112). The lidar sensor system 110 is vertically stacked above the lidar sensor system 112 in the vertically stacked lidar assembly 106. Further, the lidar sensor systems 110-112 are coaxially aligned. While the lidar sensor systems 110-112 are depicted as being vertically adjacent to each other, it is contemplated that the lidar sensor systems 110-112 can be separated from each other in the vertically stacked lidar assembly 106 while still being coaxially aligned. Moreover, while two vertically stacked lidar sensor systems 110-112 are described as being included in the vertically stacked lidar assembly 106, it is contemplated that the vertically stacked lidar assembly 106 can include more than two lidar sensor systems that are vertically stacked.

The lidar sensor systems 110-112 each spin about a shared axis of rotation 114. For each rotation of the lidar sensor system 110 about the axis 114, the lidar sensor system 110 can generate a 3D point cloud of the environment nearby the autonomous vehicle 100. The lidar sensor system 110 can have an angular range of 360 degrees in the azimuthal direction. Accordingly, the 3D point cloud generated by the lidar sensor system 110 can include points that are 360 degrees around the axis 114. Similarly, for each rotation of the lidar sensor system 112 about the axis 114, the lidar sensor system 112 can generate a 3D point cloud of the environment nearby the autonomous vehicle 100. The lidar sensor system 112 can also have an angular range of 360 degrees in the azimuthal direction, and the 3D point cloud generated by the lidar sensor system 112 can include points that are 360 degrees around the axis 114.

The lidar sensor systems 110-112 of the vertically stacked lidar assembly 106 provide redundancy. Accordingly, if one of the lidar sensor systems 110-112 fails, then the autonomous vehicle 100 can utilize the other lidar sensor system 110-112 to continue operation. By way of illustration, if the lidar sensor system 110 fails, then the autonomous vehicle 100 can utilize sensor data outputted by the lidar sensor system 112 to continue operation (e.g., the 3D point cloud outputted by the lidar sensor system 112). Following this illustration, responsive to failure of the lidar sensor system 110, a stopping point for the autonomous vehicle 100 can be detected; detection of the stopping point and/or operation of the autonomous vehicle 100 to travel to and stop at the stopping point can be based at least in part on the sensor data outputted by the lidar sensor system 112.

The lidar sensor systems 110-112 independently spin about the shared axis of rotation 114. For instance, a first motor can cause the lidar sensor system 110 to spin about the shared axis of rotation 114, and a second motor can cause the lidar sensor system 112 to spin about the shared axis of rotation 114. By way of example, the vertically stacked lidar assembly 106 can include an outer shaft and an inner shaft, both of which rotate about the shared axis 114 of rotation (e.g., the lidar sensor system 110 can be coupled to one of the outer shaft or the inner shaft, the lidar sensor system 112 can be coupled to the other shaft).

According to an example, the lidar sensor systems 110-112 can spin about the shared axis of rotation 114 at different spin rates. Pursuant to another example, the lidar sensor systems 110-112 can spin about the shared axis of rotation 114 at a common spin rate. Further, it is contemplated that a spin rate of the lidar sensor system 110 and/or a spin rate of the lidar sensor system 112 can change over time; however, the claimed subject matter is not so limited. As used herein, the term spin rate refers to a frequency at which a lidar sensor system spins about an axis of rotation.

FIG. 1 depicts the lidar sensor systems 110-112 spinning counterclockwise from a perspective shown in the top view at 102. It is to be appreciated, however, that the claimed subject matter is not so limited. For instance, it is contemplated that the lidar sensor systems 110-112 instead can spin clockwise from the perspective shown in the top view at 102. According to another example, one of the lidar sensor systems 110-112 can spin clockwise and the other one of the lidar sensor system 110-112 can spin counterclockwise (from the perspective shown in the top view at 102).

Figure 2:
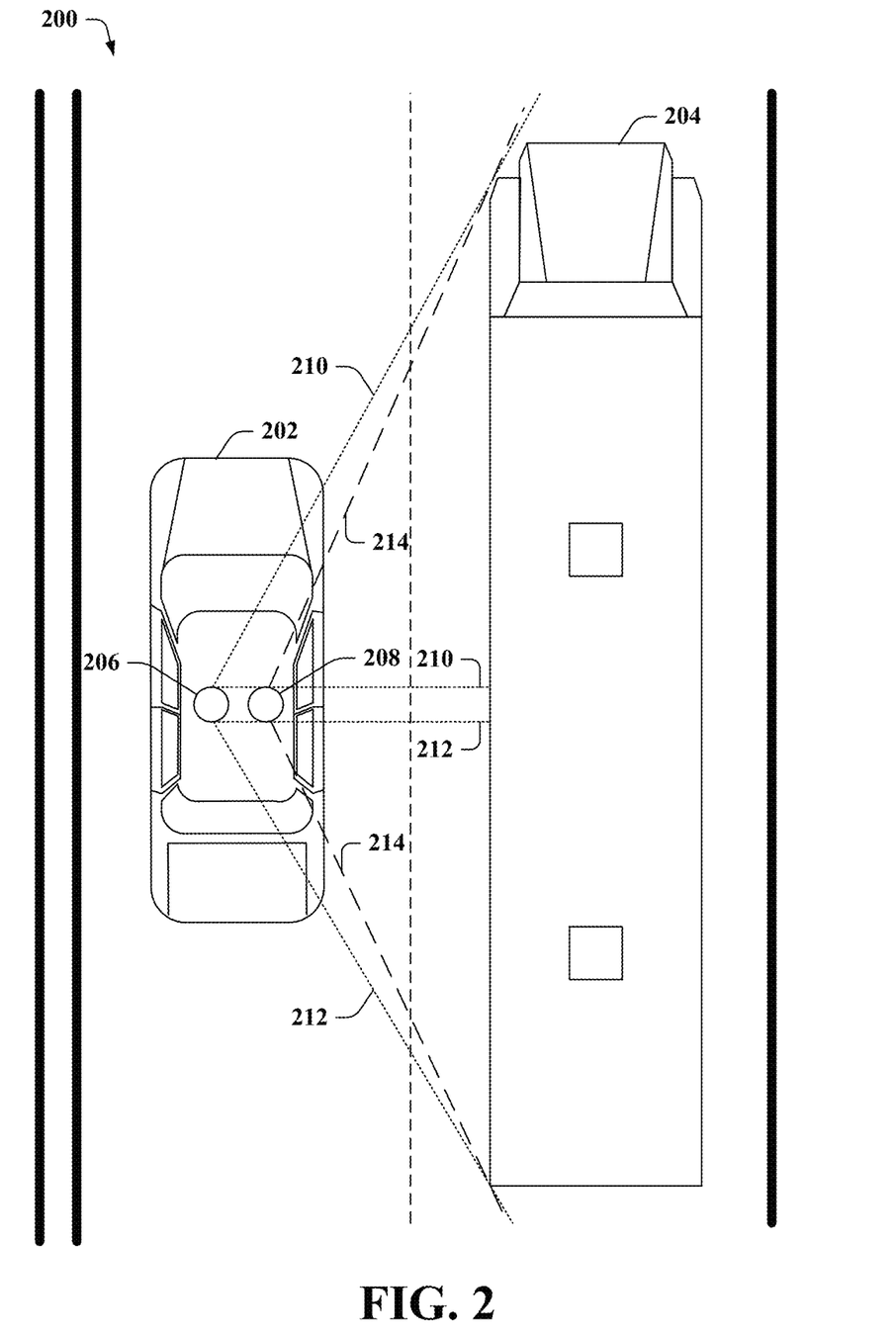
FIG. 2 illustrates an exemplary environment that includes a bus and an autonomous vehicle, where the autonomous vehicle has side-by-side lidar sensor systems mounted on a roof.

With reference to FIG. 2, illustrated is an exemplary environment 200 that includes an autonomous vehicle 202 and a bus 204. The autonomous vehicle 202 includes two side-by-side roof mounted lidar sensor systems, namely, a lidar sensor system 206 and a lidar sensor system 208 (collectively referred to herein as lidar sensor systems 206-208). The lidar sensor systems 206-208 of the autonomous vehicle 200 in the example of FIG. 2 are not vertically stacked.

The lidar sensor systems 206-208 spin about differing axes of rotation. The lidar sensor systems 206-208 are mounted on the roof of the autonomous vehicle 200 such that the lidar sensor system 206 can block a portion of a field of view of the lidar sensor system 208, and the lidar sensor system 208 can block a portion of a field of view of the lidar sensor system 206. For example, the lidar sensor system 206 can be inhibited from transmitting laser light at the lidar sensor system 208 (and the lidar sensor system 208 can be inhibited from transmitting laser light at the lidar sensor system 206). Thus, during a rotation of the lidar sensor system 206 about an axis, the lidar sensor system 206 is inhibited from transmitting laser light when the lidar sensor system 206 is directed at the lidar sensor system 208 (and no reflected laser light is received when the lidar sensor system 206 is directed at the lidar sensor system 208).

In the example depicted in FIG. 2, the lidar sensor system 206 can detect a front part of the bus 204 (within a portion of a field of view represented by lines 210) and a back part of the bus 204 (within a portion of the field of view represented by lines 212). The lidar sensor system 206 is blocked by the lidar sensor system 208 from detecting a part of the bus 204 between the front part and the back part. Moreover, the lidar sensor system 208 can detect the entire bus 204 (within a portion of a field of view of view represented by lines 214). Accordingly, the lidar sensor system 206 can detect the bus 204 as two objects, while the lidar sensor system 208 can detect the bus 204 as one object. However, it may be difficult for a perception system of the autonomous vehicle 200 to associate the one object detected by the lidar sensor system 208 with the two objects detected by the lidar sensor system 206. In contrast to the example shown in FIG. 2, the vertically stacked lidar assembly 106 of the autonomous vehicle 100 can mitigate the foregoing (e.g., since the lidar sensor systems 110-112 both have 360 degree angular ranges about the axis 114 in the azimuthal direction, since the lidar sensor system 110 does not block a portion of a field of view of the lidar sensor system 112 and the lidar sensor system 112 does not block a portion of a field of view of the lidar sensor system 110).

Reference is again made to FIG. 1. A spin rate of a lidar sensor system (e.g., the lidar sensor systems 110-112) is directly proportional to an update rate at which an object is detected and inversely proportional to a point density of the 3D point cloud generated by the lidar sensor system. For example, if a lidar sensor system is spinning at a spin rate of 10 Hz, then properties of an object (e.g., position, velocity) in an environment of the autonomous vehicle 100 can be detected every 100 milliseconds. In contrast, if the lidar sensor system is spinning at a spin rate of 20 Hz, then the properties of the object (e.g., position, velocity) can be detected every 50 milliseconds. However, a 3D point cloud generated by the lidar sensor system spinning at 10 Hz can include substantially double a number of points as compared to a 3D point cloud generated by the lidar sensor system spinning at 20 Hz.

Pursuant to various embodiments, the lidar sensor systems 110-112 can spin at differing spin rates. According to an example, the lidar sensor system 110 can spin about the axis 114 faster than the lidar sensor system 112 spins about the axis 114 (e.g., a spin rate of the lidar sensor system 110 can be greater than a spin rate of the lidar sensor system 112). Following this example, the lidar sensor system 110 can generate more frequent updates of a 3D point cloud as compared to the lidar sensor system 112. Further referring to this example, properties of an object (e.g., position of the object, velocity of the object) in an environment of the autonomous vehicle 100 can be more frequently updated by the lidar sensor system 110 as compared to the lidar sensor system 112. According to an illustration, more frequent updating of the properties of an object can aid tracking of the object (e.g., more frequent updates of the position and velocity of the object are obtained). Moreover, the 3D point cloud generated by the lidar sensor system 112 can include more points as compared to the 3D point cloud generated by the lidar sensor system 110. For instance, an object at a relatively far distance from the autonomous vehicle 100 may be detected by a perception system of the autonomous vehicle 100 based on the 3D point cloud generated by the lidar sensor system 112 that includes more points (while the perception system may be unable to detect the object at the relatively far distance based on the 3D point cloud generated by the lidar sensor system 110 that includes fewer points). Thus, again following the continuing example, the lidar sensor system 112 can be utilized for longer range object detection as compared to the lidar sensor system 110.

Continued reference is made to the foregoing example where the lidar sensor system 110 spins faster than the lidar sensor system 112. Pursuant to an illustration, the lidar sensor system 110 can have a spin rate in a range between 10 Hz and 20 Hz, while the lidar sensor system 112 can have a spin rate in a range between 5 Hz and 10 Hz. According to an example, the spin rate of the lidar sensor system 110 can be 20 Hz and the spin rate of the lidar sensor system 112 can be 10 Hz. Pursuant to another example, the spin rate of the lidar sensor system 110 can be 10 Hz and the spin rate of the lidar sensor system 112 can be 5 Hz. However, it is to be appreciated that other ranges of spin rates or combinations of spin rates are intended to fall within the scope of the hereto appended claims. Moreover, while the lidar sensor system 110 is described as spinning faster than the lidar sensor system 112, in other examples it is contemplated that the lidar sensor system 112 can spin faster than the lidar sensor system 110.

According to an example, the vertically stacked lidar assembly 106 can include one or more angular encoders that can read azimuth angles of the lidar sensor system 110 and the lidar sensor system 112. The spin rates of the lidar sensor systems 110-112 can thus be determined utilizing the angular encoder(s). For instance, feedback from an angular encoder can be utilized to control a spin rate of a lidar sensor system.

Figure 3:
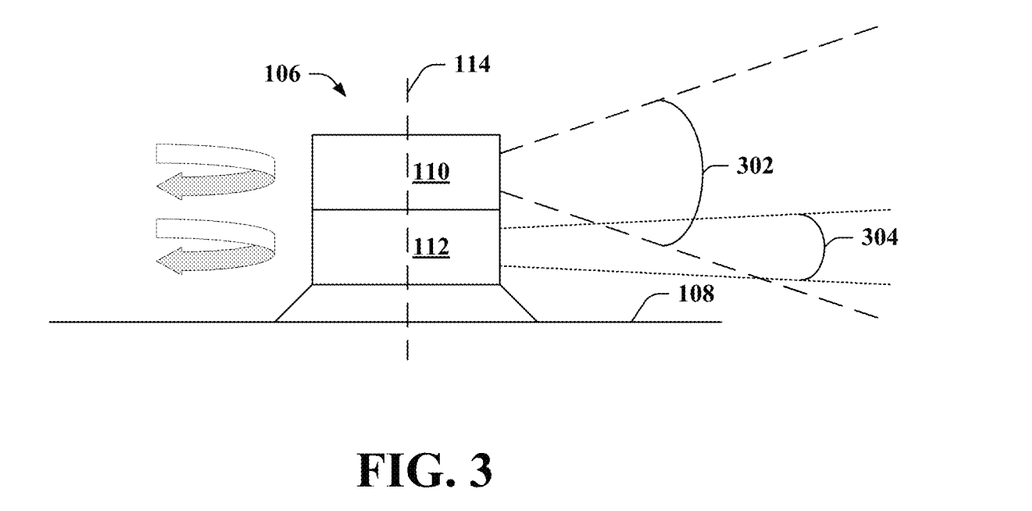
FIGS. 3-4 illustrate exemplary side views of the vertically stacked lidar assembly mounted on a roof of the autonomous vehicle.

Now turning to FIG. 3, illustrated is another exemplary side view of the vertically stacked lidar assembly 106 mounted on the roof 108 of an autonomous vehicle (e.g., the autonomous vehicle 100). Again, the vertically stacked lidar assembly 106 includes the lidar sensor system 110 vertically stacked above the lidar sensor system 112, where both lidar sensor systems 110-112 rotate about the shared axis 114 of rotation. The lidar sensor systems 110-112 can spin at different spin rates or a common spin rate.

In various embodiments, the lidar sensor systems 110-112 can have differing angular ranges in an elevation direction. As depicted in the example of FIG. 3, an angular range 302 in an elevation direction of the lidar sensor system 110 can be larger than an angular range 304 in an elevation direction of the lidar sensor system 112. Accordingly, the lidar sensor system 110 can have a wider field of view in the elevation direction as compared to the lidar sensor system 112.

Following the example shown in FIG. 3, the wider field of view in the elevation direction of the lidar sensor system 110 can accommodate elevation changes as the autonomous vehicle 100 travels within an environment (e.g., the autonomous vehicle 100 traveling up or down a hill). The field of view of the lidar sensor system 110 can also enable detecting objects relatively close to the autonomous vehicle 100. Moreover, beams can be more densely spaced in the field of view of the lidar sensor system 112 as compared to in the field of view of the lidar sensor system 110. Thus, points in a 3D point cloud generated by the lidar sensor system 112 can be denser as compared to points in a 3D point cloud generated by the lidar sensor system 110 (e.g., which can aid detection of an object at a farther distance from the autonomous vehicle 100).

According to an example, the lidar sensor system 110 having the wider field of view in the elevation direction can spin about the axis 114 faster than the lidar sensor system 112 spins about the axis 114 (e.g., a spin rate of the lidar sensor system 110 can be greater than a spin rate of the lidar sensor system 112). Following this example, an object at a relatively far distance from the autonomous vehicle 100 may be detected by a perception system of the autonomous vehicle 100 based on the 3D point cloud generated by the lidar sensor system 112 (while the perception system may be unable to detect the object at the relatively far distance based on the 3D point cloud generated by the lidar sensor system 110). Thus, the lidar sensor system 112 can be utilized for longer range object detection as compared to the lidar sensor system 110. However, the claimed subject matter is not limited to the foregoing example (e.g., the lidar sensor systems 110-112 can spin at a common spin rate, the lidar sensor system 112 having the narrower field of view in the elevation direction can spin faster than the lidar sensor system 110).

Moreover, in other embodiments, it is contemplated that an angular range in an elevation direction of the lidar sensor system 112 can be larger than an angular range in an elevation direction of the lidar sensor system 110.

Figure 4:
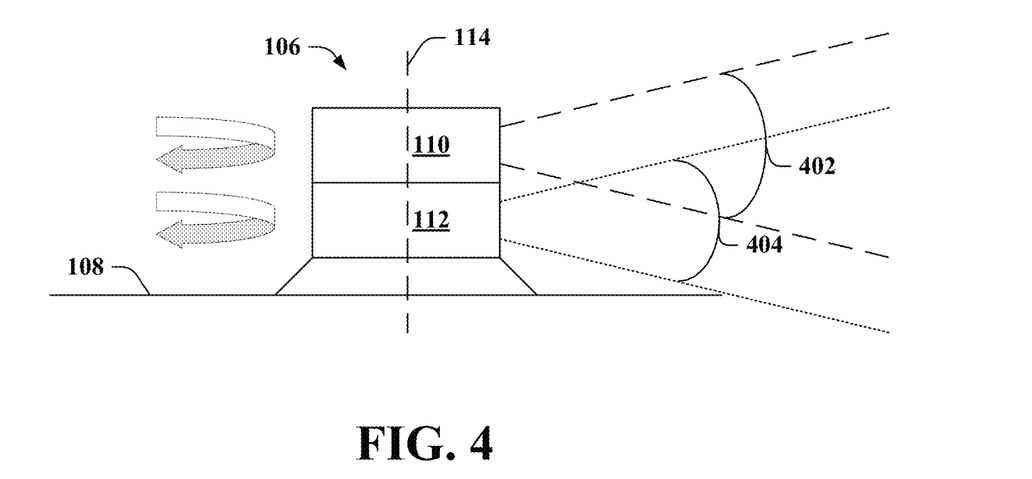

Turning to FIG. 4, illustrated is yet another exemplary side view of the vertically stacked lidar assembly 106 mounted on the roof 108 of an autonomous vehicle (e.g., the autonomous vehicle 100). The vertically stacked lidar assembly 106 includes the lidar sensor system 110 vertically stacked above the lidar sensor system 112, where both lidar sensor systems 110-112 rotate about the shared axis 114 of rotation. Again, the lidar sensor systems 110-112 can spin at different spin rates or a common spin rate.

In the example of FIG. 4, the lidar sensor systems 110-112 have substantially similar angular ranges in an elevation direction. As depicted in the example of FIG. 4, an angular range 402 in an elevation direction of the lidar sensor system 110 can be substantially similar to an angular range 404 in an elevation direction of the lidar sensor system 112. Accordingly, the lidar sensor systems 110-112 can have fields of view in the elevation direction that are substantially similar in size.

Figure 5:
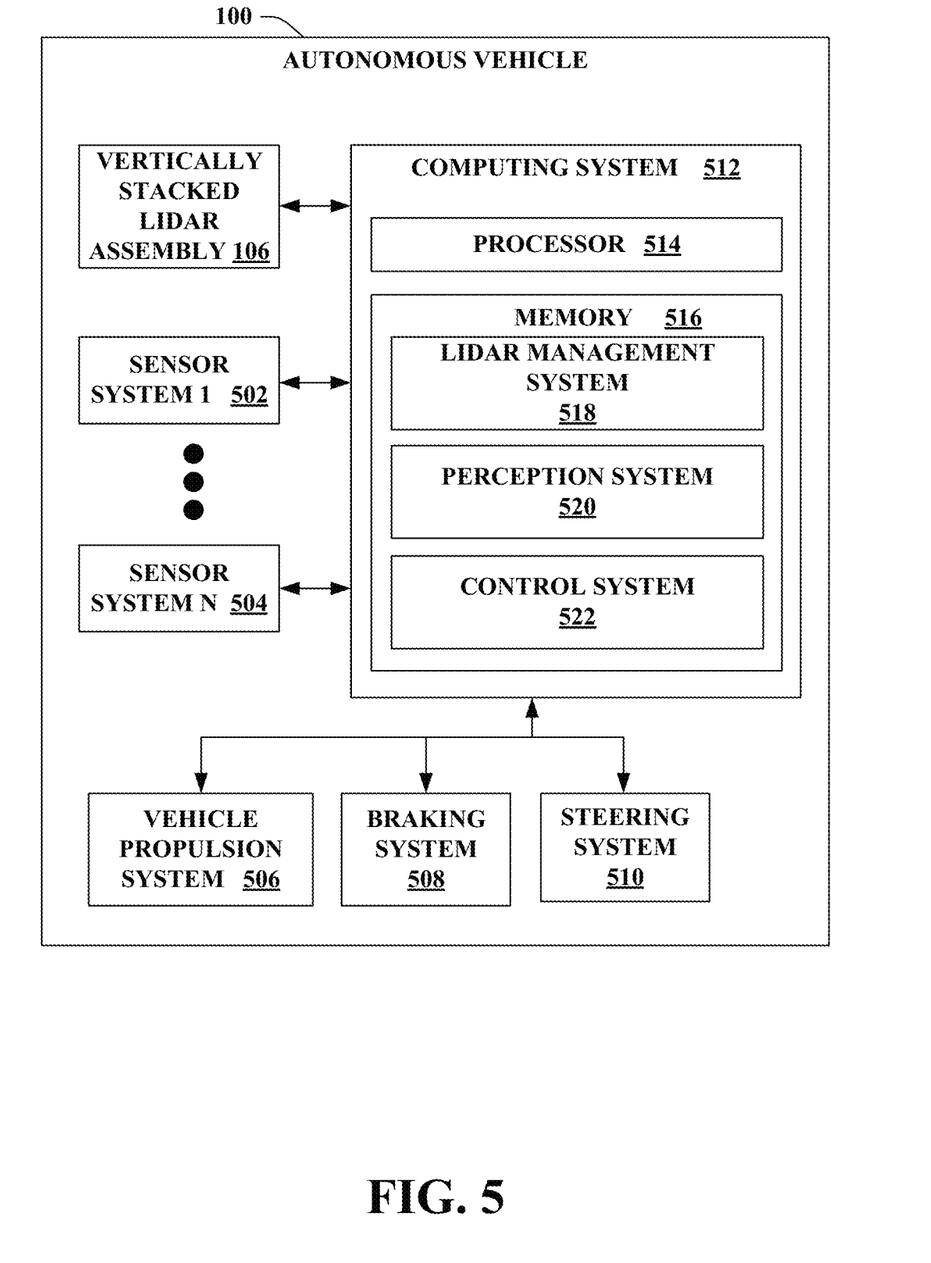
FIG. 5 illustrates an exemplary block diagram of the autonomous vehicle that includes the vertically stacked lidar assembly.

Turning to FIG. 5, illustrated is a block diagram of the autonomous vehicle 100 according to various embodiments. The autonomous vehicle 100 can navigate about roadways without human conduction based upon sensor data outputted by sensor systems of the autonomous vehicle 100. As shown in FIG. 5, the autonomous vehicle 100 includes the vertically stacked lidar assembly 106 (which includes the lidar sensor systems 110-112 described herein). The autonomous vehicle 100 can further include a sensor system 1 502, . . . , and a sensor system N 504, where N can be substantially any integer greater than one (collectively referred to herein as sensor systems 502-504). The sensor systems 502-504 are of different types and are arranged about the autonomous vehicle 100. For example, the sensor system 1 502 may be a radar sensor system and the sensor system N 504 may be a camera (image) sensor system. Other exemplary sensor systems included in the sensor systems 502-504 can include GPS sensor systems, sonar sensor systems, infrared sensor systems, lidar sensor systems (other than the vertically stacked lidar assembly 106), and the like.

The autonomous vehicle 100 further includes several mechanical systems that are used to effectuate appropriate motion of the autonomous vehicle 100. For instance, the mechanical systems can include, but are not limited to, a vehicle propulsion system 506, a braking system 508, and a steering system 510. The vehicle propulsion system 506 may be an electric engine, an internal combustion engine, or a combination thereof. The braking system 508 can include an engine break, brake pads, actuators and/or any other suitable componentry that is configured to assist in decelerating the autonomous vehicle 100. The steering system 510 includes suitable componentry that is configured to control the direction of movement of the autonomous vehicle 100.

The autonomous vehicle 100 further includes a computing system 512, which includes a processor 514 and memory 516. The computing system 512 is in communication with the vertically stacked lidar assembly 106, the sensor systems 502-504, the vehicle propulsion system 506, the braking system 508, and the steering system 510. The memory 516 of the computing system 512 includes computer-executable instructions are executed by the processor 514. Pursuant to various examples, the processor 514 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FPGA), or the like.

A lidar management system 518, a perception system 520, and a control system 522 can be loaded in the memory 516. However, in other embodiments, it is contemplated that the vertically stacked lidar assembly 106 can additionally or alternatively include the lidar management system 518.

The lidar management system 518 can be configured to dynamically control spin rates of the lidar sensor systems 110-112 of the vertically stacked lidar assembly 106. For instance, the lidar management system 518 can dynamically control a spin rate of one or more of the lidar sensor systems 110-112 of the vertically stacked lidar assembly 106 based on geographic location of the autonomous vehicle 100, time of day of operation of the autonomous vehicle 100, weather conditions in an environment of the autonomous vehicle, proximity of the autonomous vehicle 100 to nearby object(s) in an environment (e.g., proximity to another vehicle, whether a pedestrian is within proximity), velocity of the autonomous vehicle 100, and/or acceleration of the autonomous vehicle 100. It is to be appreciated that the lidar management system 518 can change the spin rates of the lidar sensor systems 110-112 independently or as a group. According to another example, the lidar management system 518 can dynamically control a spin rate of one of the lidar sensor systems 110-112 upon detection of failure of a differing one of the lidar sensor systems 110-112.

According to an example, when the autonomous vehicle 100 is driving in a city, the lidar management system 518 can cause the lidar sensor system 110 to spin at 20 Hz and the lidar sensor system 112 to spin at 10 Hz. Further following this example, when the autonomous vehicle 100 is driving on a highway, the lidar management system 518 can cause the lidar sensor system 110 to spin at 10 Hz and the lidar sensor system 112 to spin at 5 Hz. However, the claimed subject matter is not limited to the foregoing example.

Moreover, the perception system 520 is configured to assign labels to objects at locations in an environment based on sensor data generated by the lidar sensor systems 110-112 of the vertically stacked lidar assembly 106 and the sensor systems 502-504.

Further, the control system 522 is configured to control at least one of the mechanical systems of the autonomous vehicle 100. Thus, the control system 132 can control the vehicle propulsion system 506, the braking system 508, and/or the steering system 510 to cause the autonomous vehicle 100 to traverse through an environment based on object(s) detected in an environment by the perception system 520.

Figure 6:
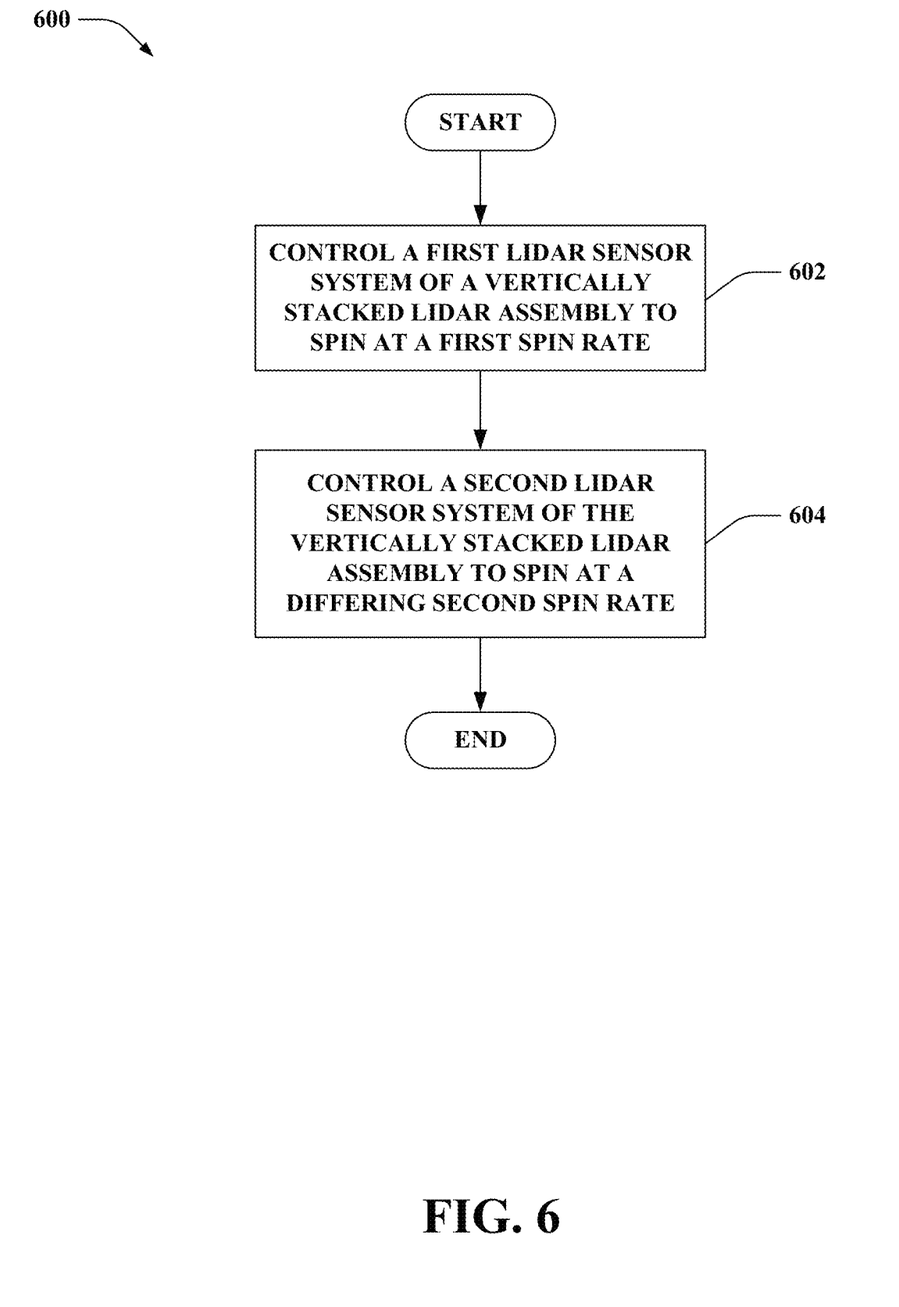
FIG. 6 is a flow diagram that illustrates an exemplary methodology of operating a vertically stacked lidar assembly of an autonomous vehicle.

FIG. 6 illustrates an exemplary methodology relating to operating a vertically stacked lidar assembly of an autonomous vehicle. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 6 illustrates a methodology 600 of operating a vertically stacked lidar assembly of an autonomous vehicle. At 602, a first lidar sensor system of the vertically stacked lidar assembly can be controlled to spin at a first spin rate. At 604, a second lidar sensor system of the vertically stacked lidar assembly can be controlled to spin at a differing, second spin rate. The first lidar sensor system is stacked above the second lidar sensor system in the vertically stacked lidar assembly. Moreover, the first lidar sensor system and the second lidar sensor system are coaxially aligned (e.g., the first lidar sensor system and the second lidar sensor system spin about a shared axis of rotation). Moreover, according to various examples, it is contemplated that the first spin rate and/or the second spin rate can be dynamically adjusted over time; however, the claimed subject matter is not so limited.

Figure 7:
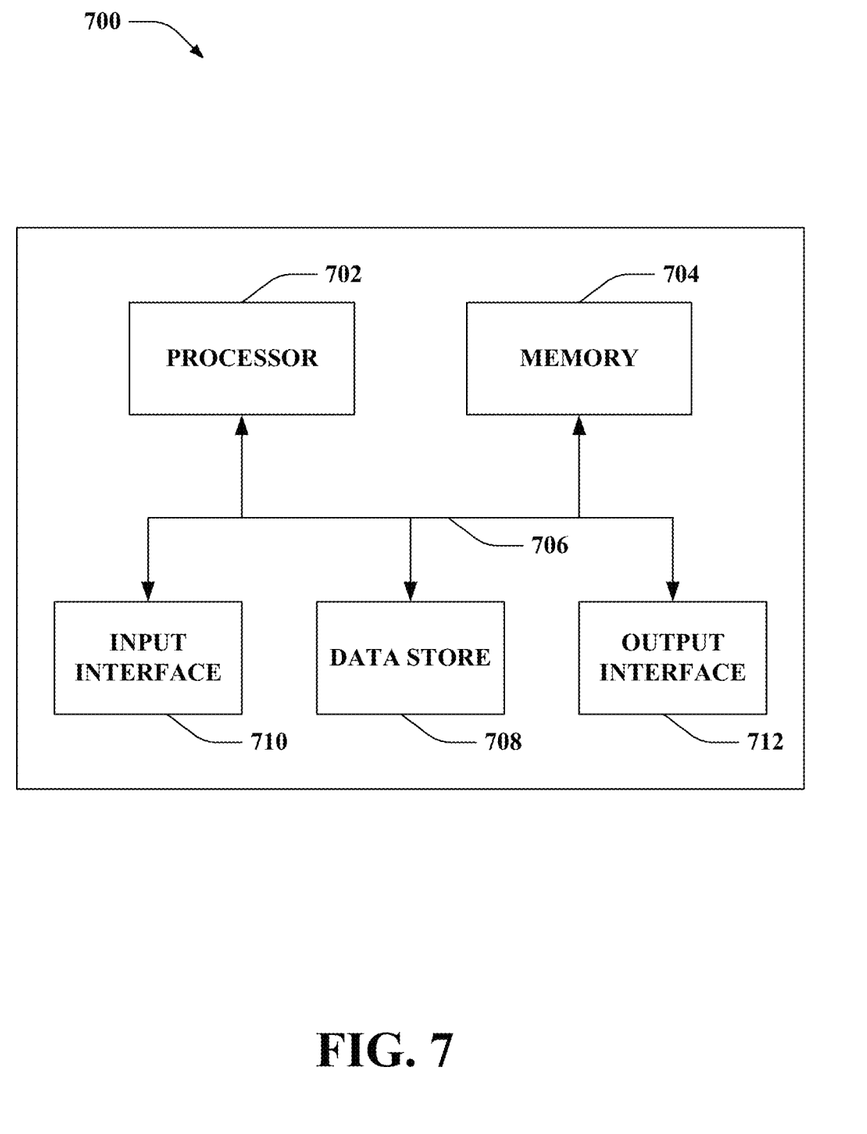
FIG. 7 illustrates an exemplary computing device.

Referring now to FIG. 7, a high-level illustration of an exemplary computing device 700 that can be used in accordance with the systems and methodologies disclosed herein is illustrated. For instance, the computing device 700 may be or include the computing system 512. The computing device 700 includes at least one processor 702 that executes instructions that are stored in a memory 704. The instructions may be, for instance, instructions for implementing functionality described as being carried out by one or more systems discussed above or instructions for implementing one or more of the methods described above. The processor 702 may be a GPU, a plurality of GPUs, a CPU, a plurality of CPUs, a multi-core processor, etc. The processor 702 may access the memory 704 by way of a system bus 706. In addition to storing executable instructions, the memory 704 may also sensor data and so forth.

The computing device 700 additionally includes a data store 708 that is accessible by the processor 702 by way of the system bus 706. The data store 708 may include executable instructions, sensor data, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to the vehicle propulsion system 506, the braking system 508, and/or the steering system 510 by way of the output interface 712. According to another example, the computing system 700 may transmit control signals to one or more of the lidar sensor systems 110-112 of the vertically stacked lidar assembly 106 to control spin rate(s).

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a vertically stacked lidar assembly of the autonomous vehicle, comprising:
      a first lidar sensor system configured to spin about an axis, wherein the first lidar sensor system spins 360 degrees around the axis at a first spin rate, and wherein the first lidar sensor system outputs a first point cloud of an environment comprising points that are 360 degrees around the axis; and
      a second lidar sensor system configured to spin about the axis, wherein the second lidar sensor system spins 360 degrees around the axis at a second spin rate, wherein the second spin rate differs from the first spin rate, and wherein the second lidar sensor system outputs a second point cloud of the environment comprising points that are 360 degrees around the axis;
      wherein the first lidar sensor system is vertically stacked above the second lidar sensor system, and wherein the first lidar sensor system and the second lidar sensor system are coaxially aligned.

2. The autonomous vehicle of claim 1, further comprising:
   a roof;
   wherein the vertically stacked lidar assembly is mounted on the roof of the autonomous vehicle.

3. The autonomous vehicle of claim 1, wherein at least one of the first spin rate of the first lidar sensor system or the second spin rate of the second lidar sensor system is dynamically adjusted over time.

4. The autonomous vehicle of claim 1, wherein the first lidar sensor system and the second lidar sensor system have differing angular ranges in an elevation direction.

5. The autonomous vehicle of claim 1, wherein the first lidar sensor system and the second lidar sensor system are configured to spin independently of each other about the axis.

6. The autonomous vehicle of claim 1, further comprising:
   a computing system, comprising:
      a processor; and
      memory that stores computer-executable instructions that, when executed by the processor, cause the processor to perform acts comprising:
         controlling the first lidar sensor system to spin at the first spin rate; and
         controlling the second lidar sensor system to spin at the second spin rate.

7. The autonomous vehicle of claim 6, wherein at least one of the first spin rate or the second spin rate is controlled based on a geographic location of the autonomous vehicle.

8. The autonomous vehicle of claim 6, wherein at least one of the first spin rate or the second spin rate is controlled based on time of day of operation of the autonomous vehicle.

9. The autonomous vehicle of claim 6, wherein at least one of the first spin rate or the second spin rate is controlled based on weather conditions in an environment of the autonomous vehicle.

10. The autonomous vehicle of claim 6, wherein at least one of the first spin rate or the second spin rate is controlled based on proximity of the autonomous vehicle to a nearby object in an environment.

11. The autonomous vehicle of claim 6, wherein at least one of the first spin rate or the second spin rate is controlled based on one or more of velocity of the autonomous vehicle or acceleration of the autonomous vehicle.

12. A method of operating a vertically stacked lidar assembly of an autonomous vehicle, comprising:
   controlling a first lidar sensor system of the vertically stacked lidar assembly to spin 360 degrees about an axis at a first spin rate;
   outputting, from the first lidar sensor system, a first point cloud of an environment comprising points that are 360 degrees around the axis;
   controlling a second lidar sensor system of the vertically stacked lidar assembly to spin 360 degrees about the axis at a second spin rate, wherein the second spin rate differs from the first spin rate; and
   outputting, from the second lidar sensor system, a second point cloud of the environment comprising points that are 360 degrees around the axis;
   wherein the first lidar sensor system is vertically stacked above the second lidar sensor system, and wherein the first lidar sensor system and the second lidar sensor system are coaxially aligned.

13. The method of claim 12, wherein:
   the first lidar sensor system is controlled to spin at the first spin rate based on at least one of a geographic location of the autonomous vehicle, time of day of operation of the autonomous vehicle, weather conditions in an environment of the autonomous vehicle, proximity of the autonomous vehicle to a nearby object in the environment, velocity of the autonomous vehicle, or acceleration of the autonomous vehicle; and
   the second lidar sensor system is controlled to spin at the second spin rate based on at least one of the geographic location of the autonomous vehicle, the time of day of operation of the autonomous vehicle, the weather conditions in the environment of the autonomous vehicle, the proximity of the autonomous vehicle to the nearby object in the environment, the velocity of the autonomous vehicle, or the acceleration of the autonomous vehicle.

14. The method of claim 12, further comprising:
   responsive to failure of one of the first lidar sensor system or the second lidar sensor system, utilizing sensor data from the other one of the first lidar sensor system or the second lidar sensor system to continue operation of the autonomous vehicle.

15. A vertically stacked lidar assembly for an autonomous vehicle, comprising:
   a first lidar sensor system configured to spin about an axis, wherein the first lidar sensor system spins 360 degrees around the axis at a first spin rate, and wherein the first lidar sensor system outputs a first 3D point cloud of an environment comprising points that are 360 degrees around the axis; and
   a second lidar sensor system configured to spin about the axis, wherein the second lidar sensor system spins 360 degrees around the axis at a second spin rate, wherein the second spin rate differs from the first spin rate, and wherein the second lidar sensor system outputs a second 3D point cloud of the environment comprising points that are 360 degrees around the axis;
   wherein the first lidar sensor system is vertically stacked above the second lidar sensor system, and wherein the first lidar sensor system and the second lidar sensor system are coaxially aligned.

16. The vertically stacked lidar assembly of claim 15, wherein an update rate of the first lidar sensor system differs from an update rate of the second lidar sensor system.

17. The vertically stacked lidar assembly of claim 15, wherein a density of the points in the first 3D point cloud generated by the first lidar sensor system differs from a density of the points in the second 3D point cloud generated by the second lidar sensor system.

18. The vertically stacked lidar assembly of claim 15, further comprising:
- a first motor configured to cause the first lidar sensor system to spin about the axis; and
- a second motor configured to cause the second lidar sensor system to spin about the axis.

19. The vertically stacked lidar assembly of claim 15, further comprising:
- an outer shaft along the axis; and
- an inner shaft along the axis;
- wherein the first lidar sensor system is coupled to one of the outer shaft or the inner shift; and
- wherein the second lidar sensor system is coupled to a differing one of the outer shaft or the inner shaft.

20. The vertically stacked lidar assembly of claim 15, wherein the first lidar sensor system and the second lidar sensor system have differing angular ranges in an elevation direction.

\* \* \* \* \*